UNITED STATES PATENT OFFICE 1,961,151

SULPHONATED CONDENSATION PRODUCT OF CARBOHYDRATES WITH HYDROCARBONS AND ALDEHYDES

Alphons O. Jaeger, Mount Lebanon, Pa., assignor to The Selden Company, Pittsburgh, Pa., a corporation of Delaware No Drawing. Application February 25, 1931, Serial No. 518,292

10 Claims. (Cl. 260—3)

This invention relates to condensation products of carbohydrates, aromatic hydrocarbons, sulphuric acid and aldehydes.

It has been proposed to condense a pure hydrocarbon such as naphthalene or benzene with cellulose and sulphuric acid to produce an artificial tanning agent.

According to the present invention I have found that such condensation products when further condensed with aldehydes such as formaldehyde, acetaldehyde, furfural and the like show an improved tanning power.

The present invention is not limited to condensation products from pure aromatic hydrocarbons, and is especially applicable to condensation products made from crude residues from the purification of aromatic hydrocarbons such as, for example, the residues from the solvent purification of crude anthracene containing phenanthrene, dead oils and larger or smaller quantities of carbazole, depending on the solvent used. Residues from the vaporization of impure aromatic hydrocarbons, such as the vaporization of crude or impure anthracene in the catalytic vapor phase oxidation of anthracene to anthraquinone, or residues from the vaporization of crude naphthalene in the catalytic vapor phase oxidation of naphthalene to phthalic anhydride may be used. These residues, which are normally thrown away as they are hardly worth handling even for low grade fuel purposes, present a very attractive group of raw materials. Instead of using residues from the purification of crude aromatic hydrocarbons, the crude coal tar fractions may be used, for example, crude anthracene, anthracene oil, heavy oil, etc. If desired, the carbohydrate may be given a preliminary treatment with phthalic anhydride or other dibasic or monobasic carboxylic acid before condensing with the aromatic hydrocarbon and cellulose, followed by further condensation with aldehydes.

The present invention is limited to condensation products in which aldehydes have entered in, and the condensation of carbohydrates with crude aromatic hydrocarbon residues and sulphuric acid is not claimed per se, but forms the subject matter of the co-pending application of A. O. Jaeger Serial No. 512,500 filed January 30, 1931 and Serial No. 512,752 filed January 31, 1931. Similarly, the condensation of carbohydrates which have been treated with phthalic anhydride or similar dibasic acid and then condensed with aromatic hydrocarbons and sulphuric acid is not claimed per se, forming the subject matter of co-pending application of A. O. Jaeger Serial No. 512,753 filed January 31, 1931.

The carbohydrates used in forming the condensation products of the present invention include cellulose, such as, for example, cotton linters, chemical wood pulp, old paper, cotton rags, and the like, or they may be soluble sugars or starch, including waste products such as molasses, and it is also possible to use lignocellulose such as wood flour, sawdust, ground wood pulp, old news papers, and the like. Where, however, lignocellulose is used, its content of aromatic compounds should be taken into consideration and a smaller amount of residue used.

Instead of condensing the aromatic hydrocarbon with cellulose and subsequently treating with an aldehyde, the sulphonated aromatic hydrocarbon may be condensed with the aldehyde and then further condensed with cellulose. By this method good products are obtained, differing slightly in their characteristics from those which are produced by reacting on the condensation product of the aromatic hydrocarbon and cellulose with an aldehyde.

The invention will be described in greater detail in the following specific examples, which illustrate typical modifications. The parts are by weight.

Example 1

50 parts of cellulose in the form of old sulphite paper are introduced into 750 parts of concentrated sulphuric acid, thorough agitation and cooling being provided. Thereupon 134 parts of the residue from the furfural purification of anthracene containing phenanthrene, carbazole, dead oils, etc. are stirred in and the stirring continued until all of the residue dissolves up. The mass is then poured into 10,000 parts of water, the excess acid neutralized with lime, filtered, and the calcium salt transformed into the sodium salt by means of sodium carbonate. On evaporating the filtered solution, a brownish mass is obtained which is the sodium salt of the condensation product. The yield amounts to 175% by weight of the cellulose and anthracene residue.

50 parts of the intermediate condensation product are then treated with 250 parts of 40% sulphuric acid and 10 parts of 30% formaldehyde solution, the mixture being stirred vigorously and heated to 80° C. for about half an hour, the stirring then being continued as the material gradually cools down. The odor of aldehyde should disappear in about two hours. A black mass is obtained which is readily soluble in water and which is an excellent tanning agent. The black mass is stirred into 700 parts of cold water and milk of lime containing 200 parts of CaO is added, neutralization being completed with calcium carbonate. After filtering, the liquid may be evaporated to produce a solid product, or, preferably, the calcium is exchanged for sodium by treatment with soda ash, followed by second filtration. The sodium salt is readily soluble in water and is an excellent tanning agent.

The tanning agent may be used alone or in admixture with other tanning agents.

The formaldehyde may be substituted by acetaldehyde, or a mixture of acetaldehyde and formaldehyde may be used.

Example 2

50 parts of cellulose in the form of old sulphite paper are introduced into 750 parts of concentrated sulphuric acid, thorough agitation and cooling being provided. Thereupon 134 parts of a residue from the purification of anthracene with orthodichlorbenzene, containing phenanthrene as its main ingredient with relatively little carbazole, are stirred in and the stirring continued until all of the residue dissolves up. The mass is then poured into 10,000 parts of water, the excess acid neutralized with lime, filtered, and the calcium salt transformed into the sodium salt by means of sodium carbonate. On evaporating the filtered solution, a brownish mass is obtained which is the sodium salt of the condensation product. The yield amounts to 173% by weight of the cellulose and anthracene residue.

The intermediate condensation product is treated with aldehyde and sulphuric acid in the same manner as described in Example 1. A soft brownish soluble mass is obtained which in the form of its alkali metal salt is an excellent tanning agent and can be used alone or in admixture with other tanning material.

Example 3

50 parts of starch or sugar are introduced into 750 parts of concentrated sulphuric acid, thorough agitation and cooling being provided. Thereupon 134 parts of a residue from the furfural purification of anthracene containing phenanthrene, carbazole, dead oils, etc. or from the purification of anthracene with orthodichlorbenzene and containing phenanthrene as its main ingredient with relatively little carbazole, are stirred in and the stirring continued until all of the residue dissolves up. The mass is then poured into 10,000 parts of water, the excess acid neutralized with lime, filtered and the calcium salt transformed into the sodium salt by means of sodium carbonate. On evaporating the filtered solution, a brownish mass is obtained which is the sodium salt of the condensation product. The yield amounts to 170% by weight of the starch and anthracene residue.

The intermediate condensation product is treated with aldehyde and sulphuric acid in the same manner as described in Example 1. A soft brownish soluble mass is obtained which in the form of its alkali metal salt is an excellent tanning agent and can be used alone or in admixture with other tanning material.

Example 4

50 parts of cellulose in the form of old sulphite paper are introduced into 750 parts of concentrated sulphuric acid, thorough agitation and cooling being provided. Thereupon 134 parts of the residue from the sublimation of crude naphthalene in the catalytic phthalic anhydride process are stirred in and the stirring continued until all of the residue dissolves up. The mass is then poured into 10,000 parts of water, the excess acid neutralized with lime, filtered, and the calcium salt transformed into the sodium salt by means of sodium carbonate. On evaporating the filtered solution, a light brown mass is obtained which is the sodium salt of the condensation product. The yield amounts to 160–170% by weight of the cellulose and naphthalene residue.

The intermediate condensation product is treated with aldehyde and sulphuric acid in the same manner as described in Example 1. A soft brownish soluble mass is obtained which in the form of its alkali metal salt is an excellent tanning agent and can be used alone or in admixture with other tanning material.

Example 5

50 parts of cellulose in the form of old sulphite paper are introduced into 750 parts of concentrated sulphuric acid, thorough agitation and cooling being provided. Thereupon 134 parts of the residue from the vaporization of crude anthracene in the catalytic anthraquinone process are stirred in and the stirring continued until all of the residue dissolves up. The mass is then poured into 10,000 parts of water, the excess acid neutralized with lime, filtered, and the calcium salt transformed into the sodium salt by means of sodium carbonate. On evaporating the filtered solution, a dark brown mass is obtained which is the sodium salt of the condensation product. The yield amounts to 173% by weight of the cellulose and anthracene residue.

The intermediate condensation product is treated with aldehyde and sulphuric acid in the same manner as described in Example 1. A soft brownish soluble mass is obtained which in the form of its alkali metal salt is an excellent tanning agent and can be used alone or in admixture with other tanning material.

Example 6

750 parts of 107.3% sulphuric acid are cooled to 20° C. and 34.3 parts pure phthalic anhydride, or the equivalent quantity of impure phthalic anhydride, are added. The mixture is further cooled to 16° C. and 50 parts of cellulose in the form of old sulphite paper, cotton linters or the like are added during four hours. The mixture is stirred during a further period of eight hours and is then a blackish liquid smelling somewhat of $SO_2$.

To this liquid are added 134 parts of residue from the purification of crude anthracene, the addition being made very slowly during a period of five hours and the temperature being kept at all times below 20° C. Stirring is continued until the reaction is complete, the resulting mass being a deep black, viscous liquid.

The intermediate condensation product is treated with aldehyde and sulphuric acid in the same manner as described in Example 1. A soft brownish soluble mass is obtained which in the form of its alkali metal salt is an excellent tanning agent and can be used alone or in admixture with other tanning material.

Example 7

1500 parts of 100% sulphuric acid are cooled to 20° C. and 70 parts pure phthalic anhydride are slowly added. After addition is complete, 100 parts cellulose in the form of waste paper or the like are added with stirring during two hours, and the mixture is further stirred with cooling for a period of three to six hours.

After the reaction is complete, 268 parts of a residue from the vaporization of semi-purified anthracene with air in the catalytic oxidation of anthracene to anthraquinone are added with constant stirring, the temperature being maintained below 25° C. and the stirring is continued until the reaction is completed.

The intermediate condensation product is treated with aldehyde and sulphuric acid in the same manner as described in Example 1. A soft brownish soluble mass is obtained which in the form of its alkali metal salt is an excellent tanning agent and can be used alone or in admixture with other tanning material.

Example 8

50 parts cellulosic material in the form of waste paper are stirred into 750 parts 100% sulphuric acid maintained at 15–18° C., after which 70 parts phthalic anhydride are added and stirring is continued for ten to twenty hours until reaction is completed. 130–140 parts residue from the vaporization of impure naphthalene in the catalytic phthalic anhydride process are slowly added with stirring during five to eight hours and the mixture is maintained at 35° C. for fifty to seventy hours until reaction is completed.

The intermediate condensation product is treated with aldehyde and sulphuric acid in the same manner as described in Example 1. A soft brownish soluble mass is obtained which in the form of its alkali metal salt is an excellent tanning agent and can be used alone or in admixture with other tanning material.

In the claims the term "phthalic anhydride" is intended to include not only the pure anhydride itself, but impure phthalic anhydride, phthalic acid, and the corresponding homologues thereof.

What is claimed as new is:

1. As a new chemical product, the soluble condensation product of a carbohydrate, phthalic anhydride, at least one aromatic hydrocarbon, sulphuric acid and an aldehyde.

2. As a new chemical product, the soluble condensation product of a carbohydrate, phthalic anhydride, at least one aromatic hydrocarbon, sulphuric acid and formaldehyde.

3. As a new chemical product, the soluble condensation product of a carbohydrate, phthalic anhydride, a substance included in the group consisting of residues from solvent purification of crude anthracene with phenanthrene and carbazole solvents, residues from solvent purification of crude anthracene with phenanthrene solvents, residues from the vaporization of impure anthracene, residues from the vaporization of crude naphthalene, sulphuric acid and an aldehyde.

4. As a new chemical product, the soluble condensation product of a carbohydrate, phthalic anhydride, a residue from the solvent purification of crude anthracene, sulphuric acid and an aldehyde.

5. As a new chemical product, the soluble condensation product of a carbohydrate, phthalic anhydride, a residue from the solvent purification of crude anthracene, sulphuric acid and formaldehyde.

6. As a new chemical product, the soluble condensation product of cellulose, phthalic anhydride, at least one aromatic hydrocarbon, sulphuric acid and an aldehyde.

7. As a new chemical product, the soluble condensation product of cellulose, phthalic anhydride, at least one aromatic hydrocarbon, sulphuric acid and formaldehyde.

8. As a new chemical product, the soluble condensation product of cellulose, phthalic anhydride, a substance included in the group consisting of residues from solvent purification of crude anthracene with phenanthrene and carbazole solvents, residues from solvent purification of crude anthracene with phenanthrene solvents, residues from the vaporization of impure anthracene, residues from the vaporization of crude naphthalene, sulphuric acid and an aldehyde.

9. As a new chemical product, the soluble condensation product of cellulose, phthalic anhydride, a residue from the solvent purification of crude anthracene, sulphuric acid and an aldehyde.

10. The products resulting from the condensation of an aldehyde with the condensation product of a carbohydrate, phthalic anhydride, an aromatic hydrocarbon and sulphuric acid, said products being light to dark brown masses soluble in water and possessing tanning properties.

ALPHONS O. JAEGER.